United States Patent
Adelman

(10) Patent No.: US 7,314,065 B1
(45) Date of Patent: Jan. 1, 2008

(54) IRREVERSIBLE PLUG ASSEMBLY

(75) Inventor: Roger Adelman, Villa Hills, KY (US)

(73) Assignee: Douglas L. Hollaender Enterprises, Inc., Loveland, OH (US)

( * ) Notice: Subject to any disclaimer, the term of this patent is extended or adjusted under 35 U.S.C. 154(b) by 0 days.

(21) Appl. No.: 11/623,765

(22) Filed: Jan. 17, 2007

(51) Int. Cl.
*F16L 55/10* (2006.01)

(52) U.S. Cl. ............................... 138/89; 97/90

(58) Field of Classification Search ........... 138/89, 138/90; 220/237, 234; 29/726, 426.6, 253; 73/49.5; 165/71
See application file for complete search history.

(56) References Cited

U.S. PATENT DOCUMENTS

| | | | |
|---|---|---|---|
| 2,607,370 A * | 8/1952 | Anderson | 138/90 |
| 3,525,365 A * | 8/1970 | Boyle et al. | 138/89 |
| 4,282,982 A * | 8/1981 | Nuesslein | 220/237 |
| 4,332,277 A * | 6/1982 | Adkins et al. | 138/89 |
| 4,422,477 A * | 12/1983 | Wittman et al. | 138/89 |
| 4,436,117 A * | 3/1984 | Martin | 138/89 |
| 4,465,104 A * | 8/1984 | Wittman et al. | 138/89 |
| 4,498,811 A * | 2/1985 | Fern et al. | 405/168.1 |
| 4,611,485 A * | 9/1986 | Leslie | 73/49.8 |
| 4,723,578 A * | 2/1988 | Mordarski et al. | 138/97 |
| 4,768,560 A * | 9/1988 | Logsdon | 138/90 |
| 4,967,468 A * | 11/1990 | Vossbrinck et al. | 29/726 |
| 4,982,763 A * | 1/1991 | Klahn | 138/89 |
| 5,437,310 A * | 8/1995 | Cunningham | 138/89 |
| 6,981,524 B2 * | 1/2006 | Jorgensen | 138/89 |

* cited by examiner

*Primary Examiner*—Patrick F. Brinson
(74) *Attorney, Agent, or Firm*—Wood, Herron & Evans, L.L.P.

(57) ABSTRACT

A plug assembly for a tube includes a tapered wedge and a sleeve. The sleeve fits over the wedge and is placed in a tube. Relative movement of the wedge and the sleeve causes the sleeve to expand and plug the tube. The exterior surface of the wedge and the interior surface of the sleeve include annular grooves. One or more compression rings in either the grooves in the sleeve or wedge permit motion of the sleeve relative to the wedge only toward the large diameter portion of the wedge. This prevents the sleeve from separating from the wedge after being installed in a tube.

6 Claims, 2 Drawing Sheets

IRREVERSIBLE PLUG ASSEMBLY

BACKGROUND OF THE INVENTION

It is often necessary to plug or seal a tube or circular opening. Plugs can be used to seal bores formed in diesel engines, such as the plug disclosed in U.S. Pat. No. 6,053,992. Plugs are also used to seal tubes in heat exchangers. There are a wide variety of different methods used to seal such tubes. In certain applications, explosive devices are used to seal off a tube. But, this is very expensive. Mechanical devices can also be used; but, in high-pressure applications, these may fail.

A potentially useful plug to seal tubes is disclosed in Hall U.S. Pat. No. 5,189,789. This discloses the use of a memory metal or Nitinol plug. Memory metals are alloys that undergo a reversible transformation from an austenitic state to a martensitic state with changes in temperature. At colder temperatures, the alloy enters the martensitic state and reverts to the austenitic state at higher temperatures. A plug in the martensitic state can be bent or shaped. When the metal reverts to the austenitic state it reverts to its original shape.

U.S. Pat. No. 5,437,310 and U.S. Pat. No. 4,425,943, the disclosures of which are hereby incorporated by reference, disclose a plug formed from a tapered rod or wedge and a sleeve that fits over the exterior surface of the wedge. Moving the sleeve relative to the wedge causes the sleeve to expand enabling it to press against the side walls of the tube to plug the tube. Thermal expansion and contraction, however, can cause this plug assembly to fail.

SUMMARY OF THE INVENTION

The present invention is premised on the realization that a plug assembly for use in heat exchanger tubes, which can be irreversibly set in a tube, includes a tapered wedge and a sleeve adapted to fit over the tapered wedge. The wedge includes exterior annular grooves and the sleeve includes interior annular grooves. Expansion rings are located in the grooves in the wedge or in the sleeves, which permit the sleeve to move in only one direction relative to the wedge. Thus, when the plug assembly is positioned in a tube and the sleeve is forced from the narrow end to the wide end of the wedge, the expansion rings will deflect to allow movement of the two, relative to each other, and will spring back into position preventing the sleeve from moving in the opposite direction. This, in effect, makes a permanent irreversible plug in the heat exchange tube.

The objects and advantages of the present invention will be further appreciated in light of the following detailed description and drawings in which:

DETAILED DESCRIPTION

Figure 1:
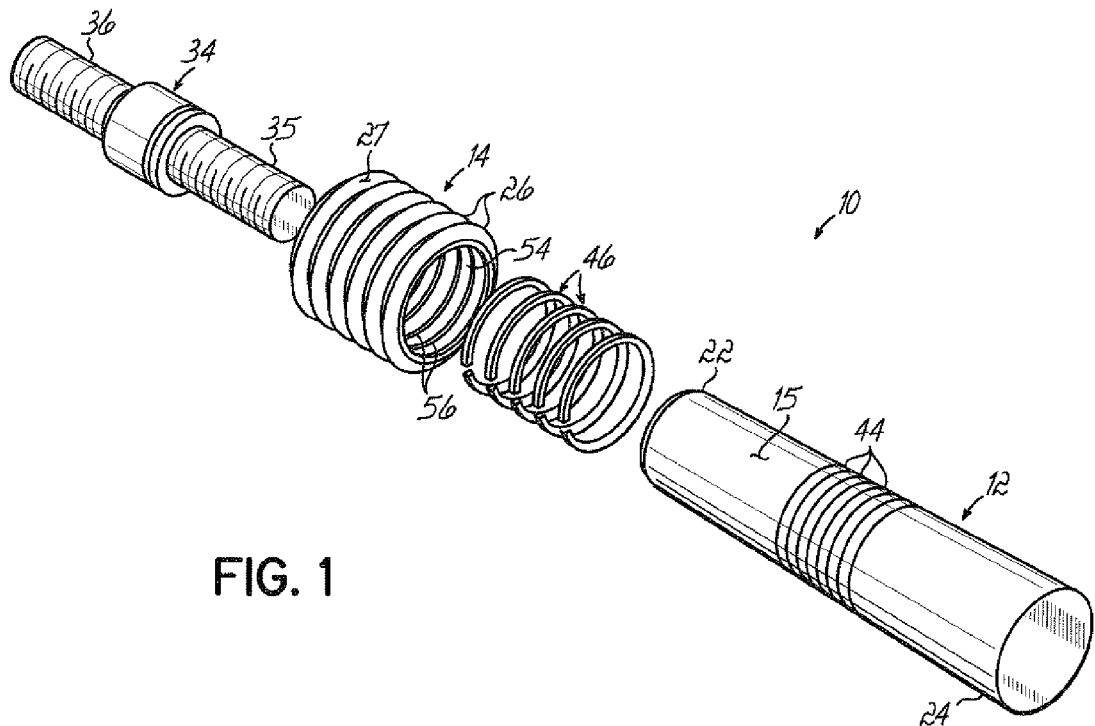
FIG. 1 is an exploded view of the plug of the present invention.

As shown in FIG. 1, the present invention is a plug assembly 10 having a tapered rod or wedge 12 having an outer tapered surface 15 and a sleeve 14. Plug assembly 10 fits into a tube 18, such as a tube of a heat exchanger. Moving sleeve 14 from a smaller diameter portion 22 of wedge 12 to a larger diameter portion 24 in the direction of arrow 20 causes the sleeve 14 to expand, forcing the ridges 26 on the external surface 27 of sleeve 14 to engage the inner surface 29 of tube 18. The force between the ridges 26 and the tube surface 29 seals tube 18.

The wedge 12, at its narrow diameter portion 22, includes an internally threaded opening 32. A connector rod 34 connects to the wedge 12 with a first externally threaded portion 35 screwed into the internally threaded opening 32. The connector rod 34 further includes a second externally threaded portion 36 separated from the first externally threaded portion by a narrowed connector portion 40.

Figure 5:
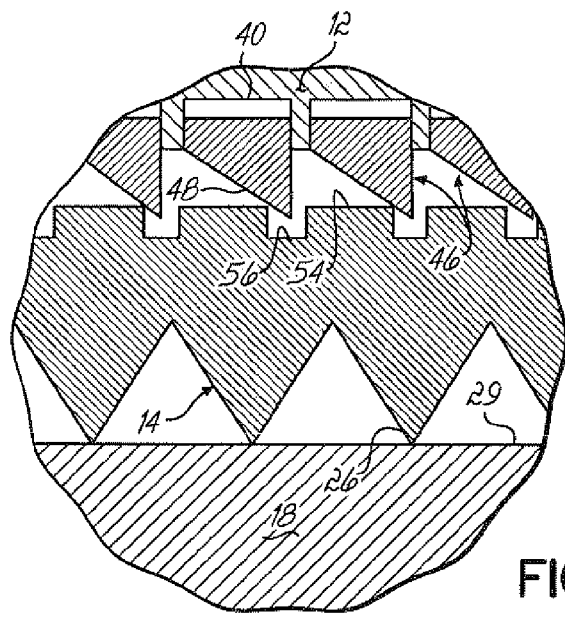
FIG. 5 is an enlarged diagrammatic depiction of the area in circle 5.

The tapered surface 15 of wedge 12 includes a plurality of annular grooves 44 located in planes perpendicular to the central axis of wedge 12, as shown in FIG. 5. Located in the annular grooves 44 are a series of compression rings 46. As shown in cross section in FIG. 5, each compression ring 46 includes a beveled edge 48 that slopes inwardly, in the same general direction as the taper of wedge 12. The grooves 44 provide sufficient clearance to allow the rings 46 to retract.

Figure 2:
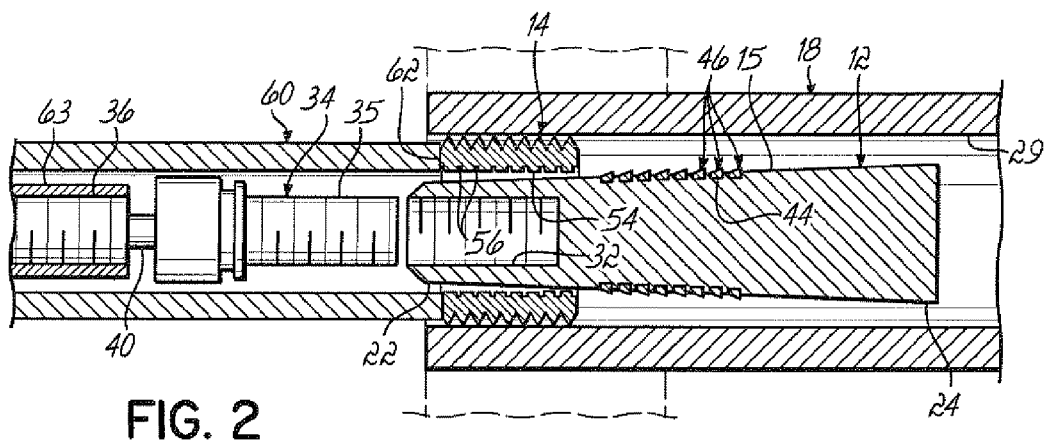
FIG. 2 is a cross sectional view of the plug of the present invention with the sleeve at first position.
Figure 3:
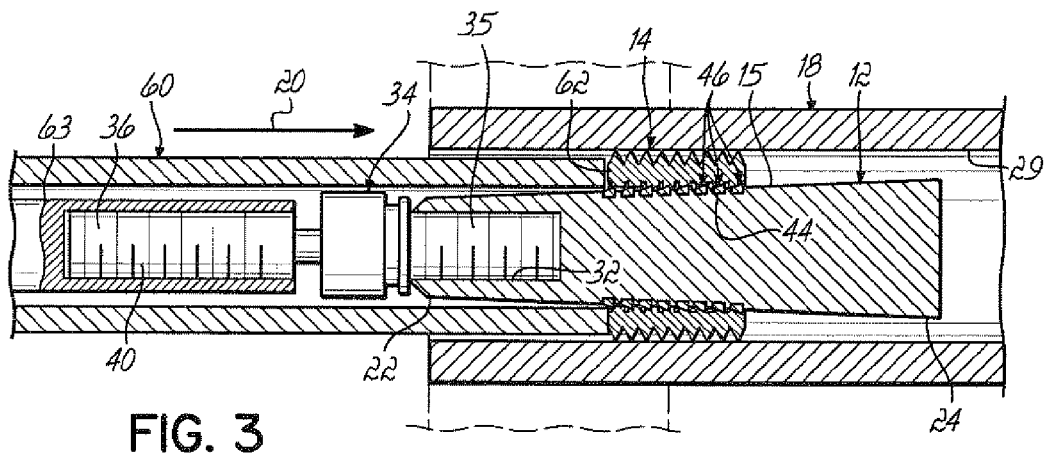
FIG. 3 is a cross sectional view of the plug of the present invention with the sleeve in an engaged, second position.
Figure 4:
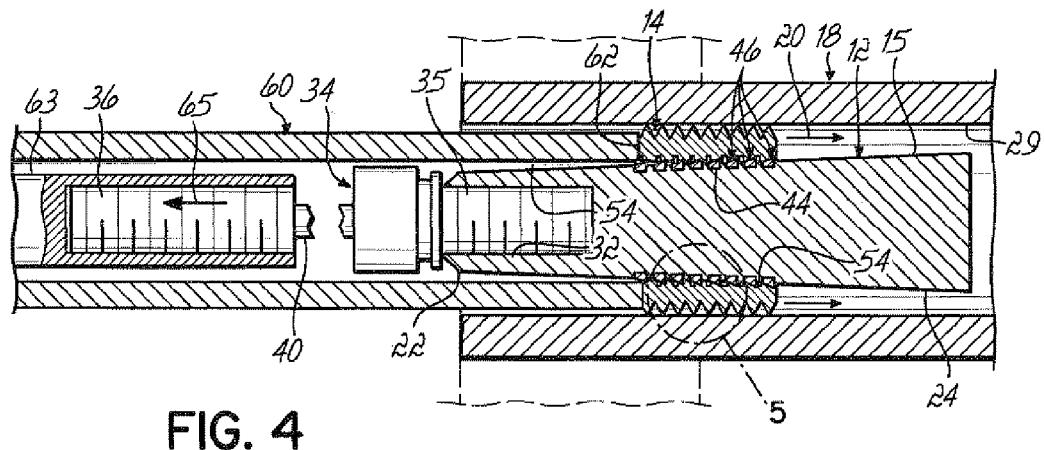
FIG. 4 is a cross sectional view of the plug of the present invention in a third position.
Figure 6:
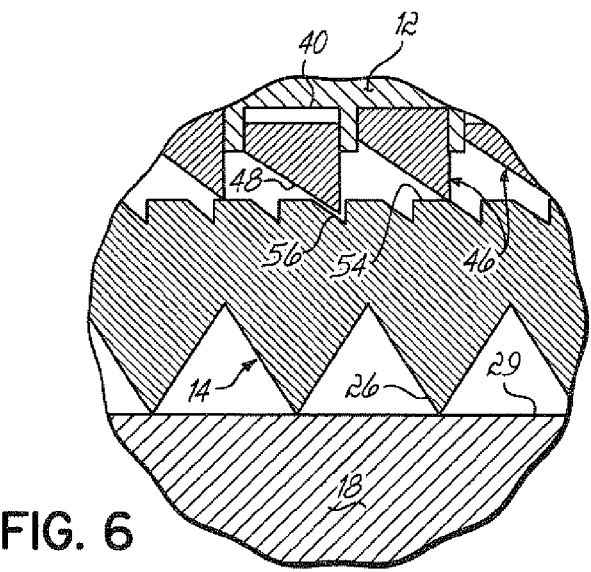
FIG. 6 is a view similar to FIG. 5 showing an alternate embodiment.

Sleeve 14 has an interior cylindrical surface 54. Surface 54 includes a series of annular grooves 56. These can have a rectangular cross section as shown in FIG. 5, or a triangular cross section that complements the beveled edge 48 as shown in FIG. 6. The interior surface 54 is sized to easily fit over the smaller diameter portion 22 of wedge 12 (see FIG. 2) and, eventually, engages the surface 15 of wedge 12 as it moves in the direction of arrow 20. The rings 46 are sized to allow the leading edge of sleeve 14 to engage the beveled edge 48 of rings 46 thereby compressing the rings 46 and forcing the rings to retract into grooves 44. Grooves 56 allow the rings to expand, as shown in FIGS. 5 and 6.

To locate the plug assembly within tube 18, the sleeve 14 is positioned on the lower diameter portion 22 of wedge 12. The first externally threaded portion 35 of connector 34 is then screwed into the internally threaded opening 32 in wedge 12. A tube 60 is located within tube 18. Tube 60 engages the end 62 of sleeve 14. A rod 63 with an internally threaded end 64 is screwed onto the second externally threaded portion 36 of connector rod 34. Tube 60 is forced inwardly in the direction of arrow 20 while the rod is pulled outwardly in the opposite direction, as represented by arrow 65.

This causes relative movement of the sleeve 14 and the wedge 12 so that the sleeve 14 moves from the smaller diameter portion 22 of wedge 12 toward the larger diameter portion 24.

As the sleeve 14 moves in the direction of arrow 20, the tapered surface 15 of wedge 12 expands sleeve 14 causing it to engage the inner surface 29 of tube 18. As the sleeve 14 moves along the surface 15 of wedge 12, the compression rings 46 flex inwardly into grooves 44, allowing the sleeve 14 to pass by the rings 46. As the sleeve 14 continues to move, the rings 46 flex outwardly into the annular grooves 56 in the interior surface 54 of the sleeve 14. Because these rings 46 have a beveled exterior edge 48, this movement can continue until the sleeve 14 is located in a position that engages the interior surface 29 of tube 18. The rings will continue to move to the next adjacent groove in sleeve 24.

The relative spacing of grooves 44 and grooves 56 determine the increment at which a ring 46 will engage or expand into a groove 56. As shown in FIG. 6, using different spacing for grooves 44 and 56 provides smaller increments of engagement. In this embodiment, a slight relative movement of the wedge and ring will cause a ring 46 to engage a groove 56 in vernier fashion.

Eventually, the force required to move sleeve 14 in the direction of arrow 20 will exceed the fracture strength of the narrow connector portion 40 of connector rod 34, causing the rod to break and separate from the plug assembly 10. The rod 63 and tube 60 are removed from the tube 18.

Compression rings 46 lodge in the annular grooves 44 in the sleeve 14. Because edge 48 is sloped or beveled toward the narrow portion 22, the sleeve 14 cannot move in a direction opposite the narrow 20. Thus, the plug is irreversibly positioned in the tube. If expansion and contraction occurs between the sleeve and wedge, no relative movement of the sleeve and wedge can occur. This keeps the plug assembly 10 firmly engaged with the inside surface 29 of tube 18.

As shown, the compression rings 46 are located in the wedge 12 with the beveled edge 48 engaging grooves 56 in the sleeve 14. The rings can also be located in the sleeve 14. In this embodiment, the interior edge of the ring will include a bevel that will engage grooves in the wedge 12.

Further, the number of rings and grooves can be varied as long as there is at least one of each.

One can replace the rings and grooves with various devices that physically inter-engage the sleeve 14 and the wedge 12. For example, the wedge can have a cylindrical non-tapered end with exterior threading. A nut with a series of washers can be used to cause the wedge 12 to engage the sleeve 14 and prevent movement. The wedge 12 could incorporate flexible tabs that permit movement only in the direction of arrow 20. If wedge 12 was partially hollow it could be swaged after installation to prevent the sleeve 14 from sliding off.

This has been a description of the present invention along with the preferred method of practicing the present invention. However, the invention itself should only be defined by the appended claims.

What is claimed is:

1. A plug assembly adapted to seal a tube comprising a tapered wedge and a sleeve having an interior surface that engages a portion of an exterior surface of said tapered wedge wherein moving said sleeve in a first direction toward a larger diameter portion of said tapered wedge causes said sleeve to expand;

an inter-engaging member located in one of said sleeve and said tapered wedge adapted to flex and allow movement of said sleeve relative to said tapered wedge and wherein said inter-engaging member engages the other of said sleeve and said tapered wedge to permit said movement in only said first direction.

2. The plug assembly claimed in claim 1 wherein said inter-engaging member comprises a ring.

3. The plug assembly claimed in claim 2 wherein said ring is located in a groove in one of said exterior surface of said tapered wedge and an interior surface of said sleeve and wherein said ring has an edge beveled in a direction permitting movement of said sleeve relative to said tapered wedge in only said first direction and preventing movement of said sleeve in a direction opposite said first direction.

4. The plug assembly claimed in claim 3 wherein a plurality of rings are located in a plurality of grooves on the exterior surface of said tapered wedge and wherein said interior surface of said sleeve incorporates a plurality of grooves.

5. The plug assembly claimed in claim 2 wherein said sleeve includes a plurality of ridges on an exterior surface.

6. The plug assembly claimed in claim 5 wherein said ring is positioned in a groove an interior surface of said sleeve and said ring has an interior beveled edge and wherein said wedge includes a series of annular grooves.

* * * * *